United States Patent
Ishiyama (10) Patent No.: US 12,307,321 B2
(45) Date of Patent: May 20, 2025

(54) READING DEVICE

(71) Applicant: TOSHIBA TEC KABUSHIKI KAISHA, Tokyo (JP)

(72) Inventor: Takumaru Ishiyama, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/500,303

(22) Filed: Nov. 2, 2023

(65) Prior Publication Data

US 2024/0249090 A1    Jul. 25, 2024

(30) Foreign Application Priority Data

Jan. 19, 2023   (JP) ................. 2023-006877

(51) Int. Cl.
*G06K 7/10* (2006.01)
*H01Q 21/24* (2006.01)

(52) U.S. Cl.
CPC ......... *G06K 7/10366* (2013.01); *H01Q 21/24* (2013.01)

(58) Field of Classification Search
CPC ........... G06K 7/10366; G06K 7/10356; H01Q 21/24; H01Q 1/2216
See application file for complete search history.

(56) References Cited

U.S. PATENT DOCUMENTS

2022/0100976 A1 *   3/2022   Sithamparanathan ................... G06K 7/10029

FOREIGN PATENT DOCUMENTS

JP        2014-131935        7/2014

\* cited by examiner

*Primary Examiner* — Matthew Mikels
(74) *Attorney, Agent, or Firm* — Amin, Turocy & Watson, LLP (57) ABSTRACT

A first transmission and reception unit to transmit a signal to and receive a signal from a wireless tag by radio waves in a predetermined range; a second transmission and reception unit arranged side by side with the first transmission and reception unit to transmit a signal to and receive a signal from the wireless tag in a range that is at least partially deviated from the predetermined range; a reading unit to read signals received by the first and the second transmission and reception unit from the wireless tag; and a determination unit to, when the wireless tag detected by one of the first and the second transmission and reception unit is detected by the other based on a reading result, determine that a movement direction is a direction from one of the first and the second transmission and reception unit toward the other.

18 Claims, 5 Drawing Sheets

| Q VALUE | ANTENNA WIDTH | θ [deg] | OUTPUT | MOVING SPEED | NUMBER OF TIMES | TOTAL NUMBER OF DATA | NUMBER OF READ SHEETS | DETECTION RATE | MISDE-TECTION RATE | TOTAL NUMBER OF DATA avg | NUMBER OF READ SHEETS avg | DETECTION RATE avg | MISDETEC-TION RATE avg |
|---|---|---|---|---|---|---|---|---|---|---|---|---|---|
| 4 | 10cm | 17.5 | 500mW | LOW | 1 | 841 | 38 | 0.63 | 0.05 | 845.8 | 38.6 | 68.2% | 3.2% |
|   |   |   |   |   | 2 | 871 | 40 | 0.8 | 0 |   |   |   |   |
|   |   |   |   |   | 3 | 782 | 40 | 0.65 | 0.03 |   |   |   |   |
|   |   |   |   |   | 4 | 865 | 37 | 0.62 | 0.05 |   |   |   |   |
|   |   |   |   |   | 5 | 870 | 38 | 0.71 | 0.03 |   |   |   |   |
| 4 | 10cm | 22.5 | 500mW | LOW | 1 | 894 | 40 | 0.7 | 0 | 802 | 40.2 | 71.4% | 0.0% |
|   |   |   |   |   | 2 | 675 | 41 | 0.71 | 0 |   |   |   |   |
|   |   |   |   |   | 3 | 967 | 40 | 0.73 | 0 |   |   |   |   |
|   |   |   |   |   | 4 | 775 | 40 | 0.73 | 0 |   |   |   |   |
|   |   |   |   |   | 5 | 699 | 40 | 0.7 | 0 |   |   |   |   |
| 4 | 10cm | 27.5 | 500mW | LOW | 1 | 639 | 40 | 0.65 | 0 | 699.2 | 40.6 | 69.0% | 0.6% |
|   |   |   |   |   | 2 | 726 | 40 | 0.7 | 0 |   |   |   |   |
|   |   |   |   |   | 3 | 584 | 42 | 0.64 | 0 |   |   |   |   |
|   |   |   |   |   | 4 | 832 | 40 | 0.75 | 0.03 |   |   |   |   |
|   |   |   |   |   | 5 | 715 | 41 | 0.71 | 0 |   |   |   |   |

FIG. 8

| ID | READING TIME POINT | | | | MOVEMENT DIRECTION |
|---|---|---|---|---|---|
| | FIRST ANTENNA | SECOND ANTENNA | THIRD ANTENNA | FOURTH ANTENNA | |
| 1001 | 10:00:00 | 10:00:01 | – | – | → |
| 1002 | – | – | 10:00:00 | 10:00:01 | → |
| ... | ... | ... | ... | ... | ... |
| 5001 | – | – | 20:00:01 | 20:00:00 | ← |
| 5002 | 20:00:01 | 20:00:00 | – | – | ← |
| ... | ... | ... | ... | ... | ... |

READING DEVICE

CROSS-REFERENCE TO RELATED APPLICATION

This application is based upon and claims the benefit of priority from Japanese Patent Application No. 2023-006877, filed on Jan. 19, 2023, the entire contents of which are incorporated herein by reference.

FIELD

Embodiments described herein relate to a reading device and methods related thereto.

BACKGROUND

In related art, commodity management using wireless tags such as RF tags becomes widespread in clothing stores and the like. Various techniques are proposed for inventory management using wireless tags. The RF tag is a tag including an IC that supports the radio frequency identification (RFID) technique and is readable without contact using radio waves or the like.

For example, when moving a hanger rack on which clothing is hung, it is convenient if it is possible to read a wireless tag attached to the clothing and determine whether a movement destination is correct or incorrect while movement. Considering such an operation, it is required to reading all moving wireless tags without omission and determine the movement direction, but currently there is no reading device suitable for such an application.

DETAILED DESCRIPTION

In general, according to one embodiment, a reading device capable of reading a moving wireless tag without omission and determining a movement direction of the tag is provided.

According to an embodiment, a reading device includes: a first transmission and reception unit configured to transmit a signal to and receive a signal from a wireless tag by radio waves radiated in a predetermined range including a horizontal direction; a second transmission and reception unit arranged side by side with the first transmission and reception unit and configured to transmit a signal to and receive a signal from the wireless tag by radio waves radiated in a range that is at least partially deviated from the range of the radio waves radiated by the first transmission and reception unit; a reading unit configured to read signals received by the first transmission and reception unit and the second transmission and reception unit from the wireless tag; and a determination unit configured to, when the wireless tag detected by one of the first transmission and reception unit and the second transmission and reception unit is detected by the other of the first transmission and reception unit and the second transmission and reception unit based on a reading result by the reading unit, determine that a movement direction of the wireless tag is a direction from the one of the first transmission and reception unit and the second transmission and reception unit toward the other.

Figure 1:
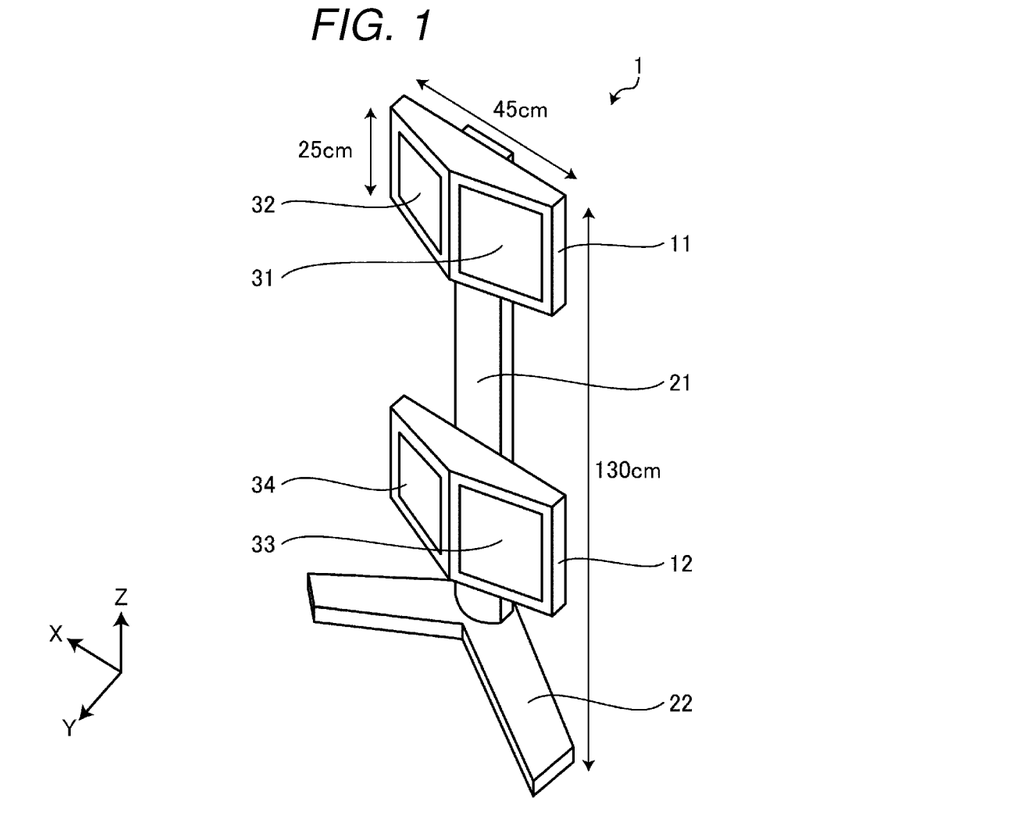
FIG. 1 is a perspective view illustrating an example of an appearance of a reading device according to an embodiment.

Embodiments will be described with reference to the drawings. FIG. 1 is a perspective view illustrating an example of an appearance of a reading device 1 according to an embodiment. Here, a three-dimensional coordinate system is also illustrated in the drawing for convenience of description. In the three-dimensional coordinate system, a width direction (a left-right direction) of the reading device 1 is an X-axis direction, a depth direction (a front-rear direction) thereof is a Y-axis direction, and a height direction (an upper-lower direction) thereof is a Z-axis direction. A positive direction of a Z axis is a direction from a lower side to an upper side. A positive direction of a Y axis is a direction from a back side to a front side of the reading device 1, and the positive direction of the Y axis is defined as "forward". A positive direction of an X axis is a direction from right to left when facing forward (the positive direction of the Y axis).

The reading device 1 includes a first housing 11, a second housing 12, a column portion 21, a foot portion 22, and two pairs of antennas (a first antenna 31, a second antenna 32, a third antenna 33, and a fourth antenna 34).

The column portion 21 and the foot portion 22 are an example of a stand that supports the first housing 11 and the second housing 12 at different heights. The column portion 21 is supported in a standing manner by the foot portion 22 such that a longitudinal direction is substantially vertical. The first housing 11 and the second housing 12 are attached to the column portion 21 at different heights and are supported by the column portion 21.

A first pair in the two pairs of antennas is the first antenna 31 and the second antenna 32. A second pair in the two pairs of antennas is the third antenna 33 and the fourth antenna 34. The pairs are located at different heights. Specifically, the first antenna 31 and the second antenna 32 are accommodated in the first housing 11, and the third antenna 33 and the fourth antenna 34 are accommodated in the second housing 12.

The first antenna 31 is an example of a first transmission and reception unit that transmits signals to and receives signals from a wireless tag by radio waves radiated in a predetermined range including a horizontal direction.

The second antenna 32 is an example of a second transmission and reception unit paired with the first transmission and reception unit (the first antenna 31). The second antenna 32 is arranged side by side with the first transmission and reception unit, and transmits signals to and receives signals from the wireless tag by radio waves radiated in a range that is at least partially deviated from the range of the radio waves radiated by the first transmission and reception unit.

The third antenna 33 is an example of a third transmission and reception unit that is located at a position different in height from the first transmission and reception unit (the first antenna 31), and transmits signals to and receives signals from the wireless tag by radio waves radiated in a range whose height is different from that of the range of the radio waves radiated by the first transmission and reception unit.

The fourth antenna 34 is an example of a fourth transmission and reception unit paired with the third transmission and reception unit (the third antenna 33). The fourth antenna 34 is arranged side by side with the third transmission and reception unit, and transmits signals to and receives signals from the wireless tag by radio waves radiated in a range that is at least partially deviated from the range of the radio waves radiated by the third transmission and reception unit.

As described above, the reading device 1 includes the two pairs of antennas including a pair of the first antenna 31 and the second antenna 32 and a pair of the third antenna 33 and the fourth antenna 34.

A height of the reading device 1 is, for example, approximately 130 cm. Dimensions of the first housing 11 and the second housing 12 are, for example, 45 cm in width and 25 cm in height. The various dimensions exemplified here are intended to facilitate imagination of a general size of the reading device 1, and dimensions in practice may not be exactly the same.

Figure 2:
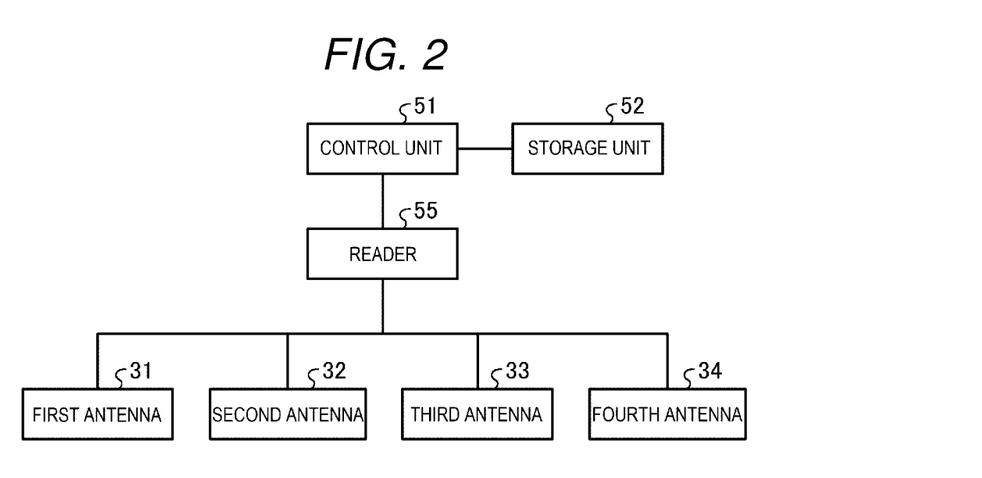
FIG. 2 is a block diagram illustrating an example of a configuration of the reading device.

FIG. 2 is a block diagram illustrating an example of a configuration of the reading device 1. The reading device 1 further includes a control unit 51, a storage unit 52, and a reader 55.

The reader 55 is an example of a reading unit, controls transmission and reception of radio waves by the first to fourth antennas 31 to 34, reads signals received from the wireless tag, and outputs the read results to the control unit 51. The reader 55 performs control to drive the first to fourth antennas 31 to 34 sequentially rather than simultaneously. Accordingly, it is possible to associate which antenna has received the signal acquired by the reader 55.

The control unit 51 includes a central processing unit (CPU), a read only memory (ROM), and a random access memory (RAM), and implements various functions by the CPU executing a program stored in the ROM or the like. The storage unit 52 is, for example, a solid state drive (SSD) or a flash memory, and stores information output by the reader 55, a processing result of the control unit 51, and the like.

The control unit 51 functions as a "determination unit" based on execution of the program. The determination unit determines a movement direction of the wireless tag based on a reading result of the reading unit (the reader 55). More specifically, for example, when the wireless tag detected by the first antenna 31 is detected by the second antenna 32, it is determined that the movement direction of the wireless tag is a direction from the first antenna 31 toward the second antenna 32. When a detection order is reversed, it is determined that the movement direction is opposite. The same applies to the third antenna 33 and the fourth antenna 34.

Figure 3:
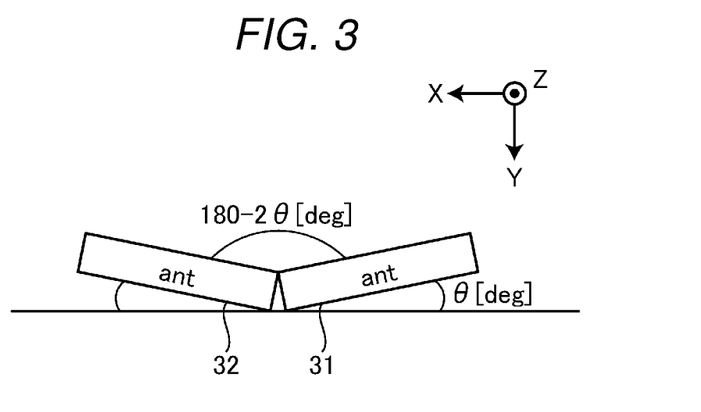
FIG. 3 is a diagram illustrating an example of an angle formed by a first antenna and a second antenna.

FIG. 3 is a diagram illustrating an example of an angle θ formed by the first antenna 31 and the second antenna 32. An angle formed by the third antenna 33 and the fourth antenna 34 is the same as that in FIG. 3.

Surfaces of the first antenna 31 and the second antenna 32 that radiate radio waves are inclined with respect to the X axis (the width direction). Inclining directions are line-symmetric with respect to the Y axis. The angle θ between the X axis and each of the surfaces of the antennas 31 and 32 that radiate radio waves is approximately 20°. In this case, an angle formed by back surfaces of the surfaces of both the first antenna 31 and the second antenna 32 on a side on which circularly polarized waves are radiated (an included angle between the first antenna 31 and the second antenna 32) is an obtuse angle of approximately 140°. An experimental result when the angle θ is 17.5° to 27.5° (the above included angle is 125° to 145°) will be described later.

Figure 4:
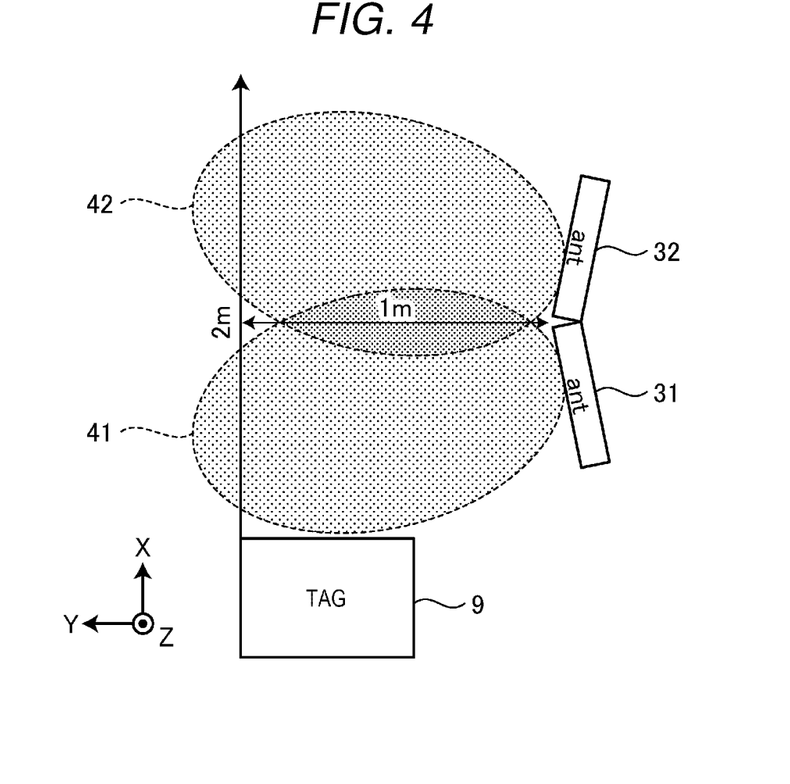
FIG. 4 is a diagram illustrating an example of a range in which radio waves radiated by the first antenna and the second antenna reach.

FIG. 4 is a diagram illustrating an example of a range in which radio waves radiated by the first antenna 31 and the second antenna 32 reach. A range in which radio waves radiated by the third antenna 33 and the fourth antenna 34 reach is also the same as that in FIG. 4 in a plan view (looking down in a negative direction of the Z axis).

The first to fourth antennas 31 to 34 are preferably directional antennas, such as planar antennas that radiate circularly polarized waves. The circularly polarized waves travel in a spiral, and thus are suitable for reading when an orientation of a wireless tag to be read is not constant.

A range (a reading range) in which a wireless tag can be read by a planar antenna that radiates circularly polarized waves is up to approximately several meters from a front side of the antenna. In the present embodiment, a reliably readable range is assumed to be up to approximately 1 m from a front side of each of the first to fourth antennas 31 to 34. In the present embodiment, a readable range in a horizontal direction (X-axis direction) of a pair of antennas is assumed to be approximately 2 m.

In FIG. 4, a reading range 41 of the first antenna 31 and a reading range 42 of the second antenna 32 are shown by dotted ellipses. In the present embodiment, the first antenna 31 and the second antenna 32 are arranged such that the reading range 41 and the reading range 42 partially overlap, and the reading range 41 and the reading range 42 may be separated.

When a wireless tag 9 is within the reading ranges 41 and 42, information stored in the wireless tag 9 is read by the first and second antennas 31 and 32. Here, the wireless tag 9 is, for example, an RF tag. The RF tag is a tag including an IC that supports the radio frequency identification (RFID) technique and is readable without contact using radio waves or the like.

Figure 5:
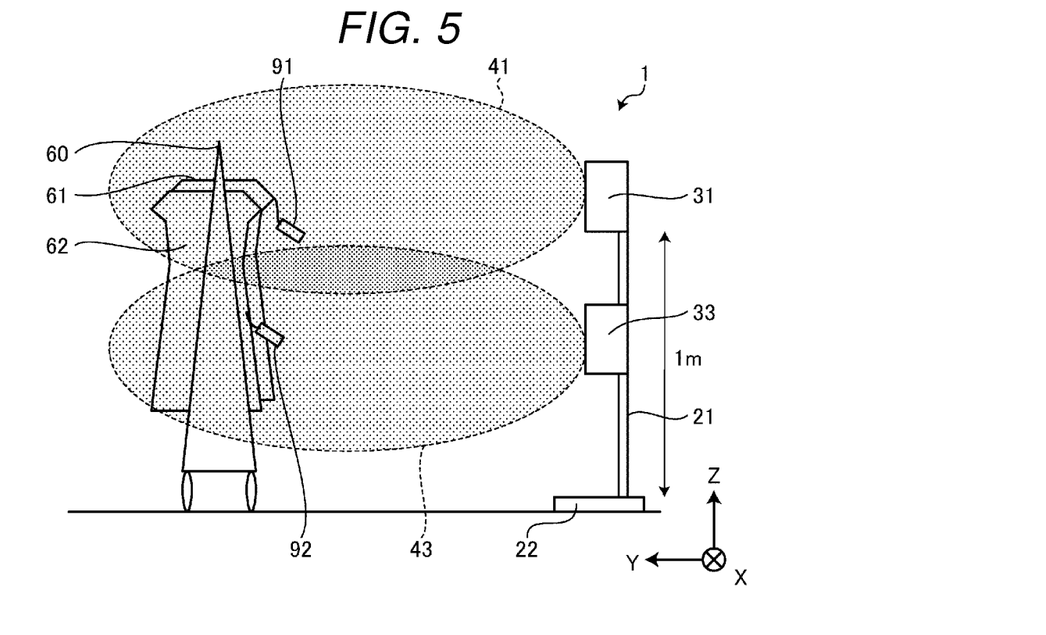
FIG. 5 is a diagram illustrating a usage state of the reading device.

FIG. 5 is a diagram illustrating a usage state of the reading device 1. The reading device 1 is installed in a moving path of a hanger rack 60 on which commodities 61 and 62 such as clothing are hung. The reading device 1 reads information stored in wireless tags 91 and 92 when the wireless tags 91 and 92 attached to the commodities 61 and 62 passing in front of the reading device 1 are within the reading ranges 41 and 43. Here, the reading range 43 is a readable range of the third antenna 33.

For example, a sales clerk of a clothing store who is taking inventory hangs the commodities 61 and 62 on the hanger rack 60 and moves the commodities from a backyard to the store. The wireless tag 91 is attached to the commodity 61, and the wireless tag 92 is attached to the commodity 62. The wireless tag 91 is hung on a cuff of the commodity 61, which is clothing, and the wireless tag 92 is hung around a waist of the commodity 62, which is clothing. In this case, there may be a large difference between a height of the wireless tag 91 and a height of the wireless tag 92 to an extent that misreading may occur if there is only one antenna in the height direction.

Even in such a case, since the reading device 1 according to the present embodiment includes antennas in upper and lower two stages, namely the first antenna 31 and the second antenna 32 in an upper stage, and the third antenna 33 and the fourth antenna 34 in a lower stage, reading errors are less likely to occur even if the wireless tags 91 and 92 are present in a wide range in the height direction.

Since the reading range 41 and the reading range 42 partially overlap, for example, the wireless tag 91 may be read by both the first antenna 31 and the third antenna 33.

Regarding this, when a reading result of a signal received by the first antenna 31 and a reading result of a signal received by the third antenna 33 overlap, it is possible to solve the problem by giving priority to a higher radio wave intensity at the time of reception or by determining the higher priority in advance.

Overlapping of reading results of the second antenna 32 and the fourth antenna 34 due to overlapping of the reading range 41 and the reading range 42 can also be solved by the same method as described above.

Figure 6:
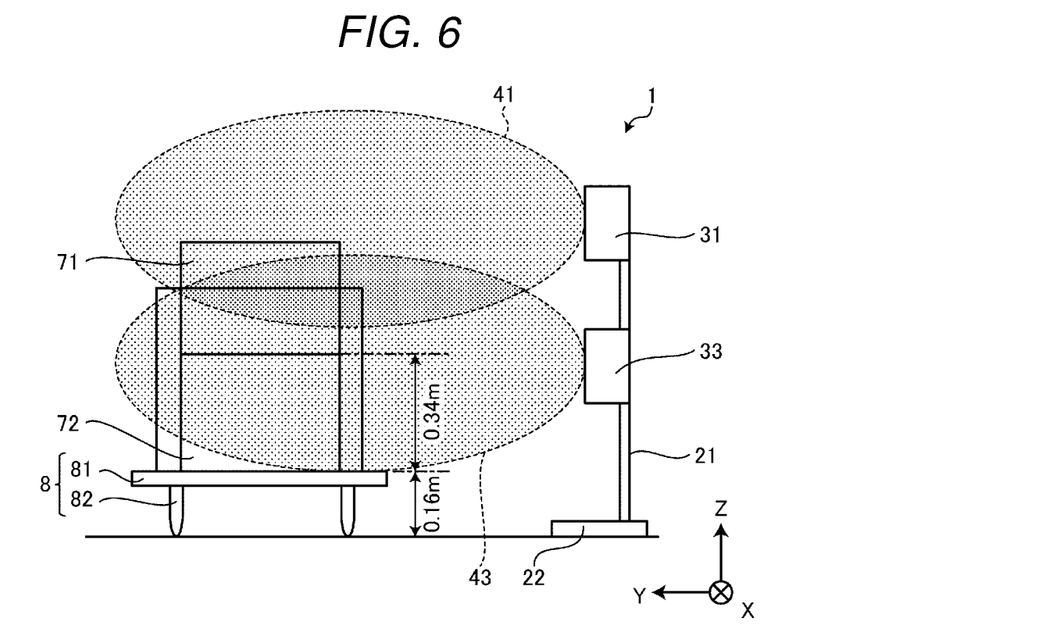
FIG. 6 is a diagram illustrating another usage state.

FIG. 6 is a diagram illustrating another usage state of the reading device 1. As in an example illustrated in this drawing, even when containers 71 and 72 that store wireless tags are loaded onto a trolley 8 and transported, the wireless tags in the containers 71 and 72 can be read by installing the reading device 1 in a transport path.

The trolley 8 is provided with wheels 82 under a stand 81, a height of the stand 81 is, for example, 0.16 m, and a height of each of the containers 71 and 72 is, for example, 0.34 m. When the containers 71 and 72 are stacked on the trolley 8 in two to three stages, the reading device 1 having a size exemplified in the present embodiment can be used.

Figure 7:
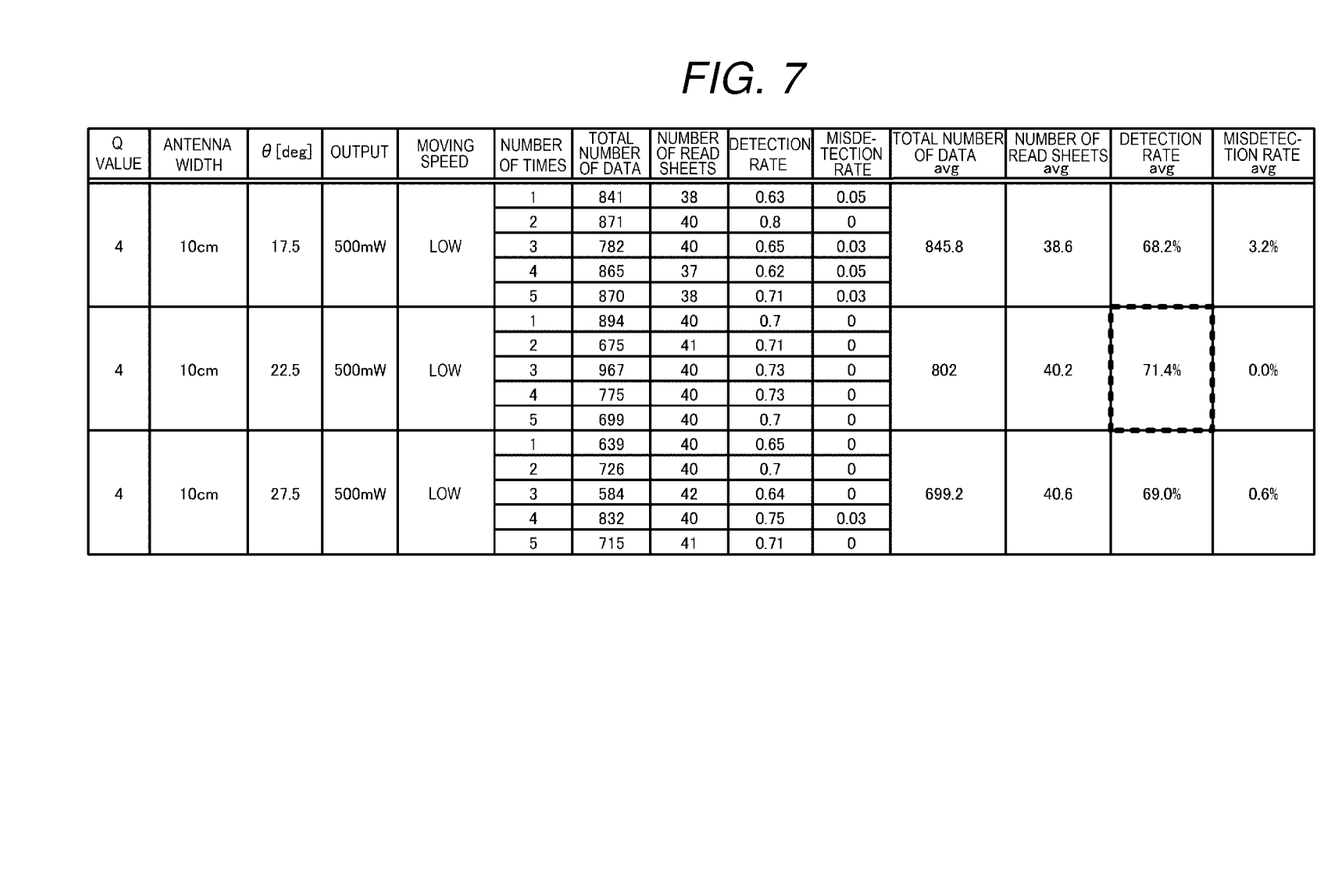
FIG. 7 is a diagram illustrating a detection rate (an average value) when a value (an angle) of an angle illustrated in FIG. 3 is changed.

FIG. 7 is a diagram illustrating a detection rate (an average value) when a value (an angle) of the angle θ illustrated in FIG. 3 is changed. As the angle θ formed between each of the first to fourth antennas 31 to 34 and the X axis, for example, as illustrated in the drawing, 17.5°, 22.5°, and 27.5° were adopted and compared. The antenna used for the comparison has an antenna width of 10 cm, a Q value of 4, and an output of 500 mW.

In the experiment at each angle, a moving speed of the trolley 8 was slightly slower than an actual speed, and the measurements were taken five times. In each experiment, a total number of data and the number of read sheets were recorded, and a detection rate and a misdetection rate were measured. An average value of the total number of data, an average value of the number of read sheets, an average value of the detection rate, and an average value of the misdetection rate were calculated by averaging results of the five times of measurements at each angle.

As a result, it was found that when a value of the angle θ was 22.5°, the average value of the detection rate showed the best value, and no misdetection occurred. Accordingly, it is considered that approximately 22.5° is appropriate for the value of the angle θ at least in the reading device 1 having a structure illustrated in FIG. 1. When the angle θ is 22.5°, the included angle between the first antenna 31 and the second antenna 32 is 135°.

Figure 8:
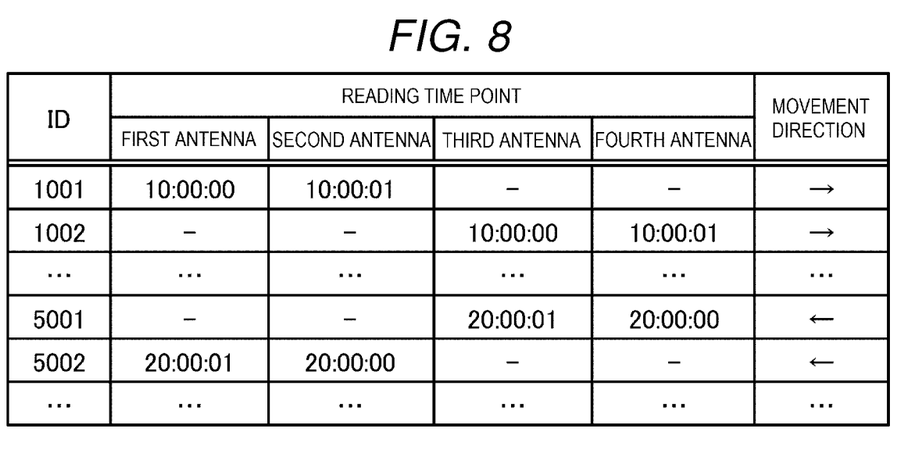
FIG. 8 is a diagram illustrating an example of summarizing reading results by the reading device.

FIG. 8 is a diagram illustrating an example of summarizing reading results of the reading device 1. The reading results when using the reading device 1 as illustrated in FIGS. 5 and 6 are summarized in a table shown in FIG. 8, for example. In this drawing, an ID and a reading time point of the wireless tag read by each of the antennas 31 to 34 are summarized for each ID, and a movement direction determined by a determination unit (a function of the control unit 51) is followed based on the results.

The illustrated example will be described. When a time point when a wireless tag having an ID "1001" is read by the first antenna 31 is "10:00:00" and a time point when the wireless tag having the same ID "1001" is read by the second antenna 32 is "10:00:01", a determination unit (the control unit 51) determines that a movement direction of the wireless tag is a direction shown by an arrow, that is, a direction from the first antenna 31 toward the second antenna 32. At the same time point, the third antenna 33 and the fourth antenna 34 read a wireless tag having an ID "1002", and a movement direction is a direction from the third antenna 33 toward the fourth antenna 34. Based on the reading results, it can be determined that movement directions of wireless tags having the two IDs are the same, as shown by rightward arrows.

When a time point when a wireless tag having an ID "5001" is read by the fourth antenna 34 is "20:00:00" and a time point when the wireless tag having the same ID "5001" is read by the third antenna 33 is "20:00:01", the determination unit (the control unit 51) determines that a movement direction of the wireless tag is a direction shown by an arrow, that is, a direction from the fourth antenna 34 toward the third antenna 33. At the same time point, the second antenna 32 and the first antenna 31 read a wireless tag having an ID "5002", and a movement direction is a direction from the second antenna 32 toward the first antenna 31. Based on the reading results, it can be determined that movement directions of wireless tags having the two IDs are the same, as shown by leftward arrows.

As described above, according to the reading device 1 of the present embodiment, a movement direction of a wireless tag can be determined using a difference between reading time points of a pair of antennas (the pair of the first antenna 31 and the second antenna 32, or the pair of the third antenna 33 and the fourth antenna 34) arranged side by side.

According to the reading device 1 of the present embodiment, when a plurality of antennas are installed side by side, an installation space can be reduced as compared with a case where the antennas are installed individually, and an effort required for installation can be minimized.

In the reading device 1 according to the present embodiment, since one reader 55 collectively controls the plurality of antennas 31 to 34 and sequentially drives the plurality of antennas 31 to 34, a cost of the device can be reduced.

As described above, according to the present embodiment, it is possible to provide the reading device 1 capable of reading a moving wireless tag without omission and determining a movement direction of the tag.

In the present embodiment, antenna pairs (pairs of antennas arranged side by side) in plural stages are provided to increase a reading range in the upper-lower direction, but an antenna pair in one stage may be provided if the reading range is narrowed down. Conversely, the reading device 1 may include antenna pairs in three or more stages in the upper-lower direction if necessary.

In practice, the value of the angle θ may be changed. With this configuration, the reading device 1 can change and adjust the reading range.

Further, positions of the housings 11, 12 may be changeable with respect to the column portion 21 in practice. With this configuration, the reading device 1 can change and adjust the reading range in the height direction.

While certain embodiments have been described, these embodiments have been presented by way of example only, and are not intended to limit the scope of the exemplary embodiments. The novel embodiments can be performed in various other forms, and various omissions, replacements, changes, and combinations can be made in the gist not departing from the gist of the exemplary embodiments. The embodiments and the modifications thereof are included in the scope and the gist of the exemplary embodiments, and are included in a scope of the exemplary embodiments disclosed in the claims and equivalents thereof.

What is claimed is:

1. A reading device, comprising:
   a first transmission and reception component configured to transmit a signal to and receive a signal from a wireless tag by radio waves radiated in a predetermined range including a horizontal direction;

a second transmission and reception component arranged side by side with the first transmission and reception component and configured to transmit a signal to and receive a signal from the wireless tag by radio waves radiated in a second range that is at least partially deviated from the predetermined range of the radio waves radiated by the first transmission and reception component;

a reading component configured to read signals received by the first transmission and reception component and the second transmission and reception component from the wireless tag; and a determination component configured to, when the wireless tag detected by one of the first transmission and reception component and the second transmission and reception component is detected by other of the first transmission and reception component and the second transmission and reception component based on a reading result of the reading component, determine that a movement direction of the wireless tag is a direction from the one of the first transmission and reception component and the second transmission and reception component toward the other, wherein the first transmission and reception component and the second transmission and reception component are planar antennas that radiate circularly polarized waves, and an angle formed by back surfaces of the first transmission and reception component and the second transmission and reception component on a side on which the circularly polarized waves are radiated is an obtuse angle.

2. The reading device according to claim 1, further comprising:

a third transmission and reception component located at a position different in height from the first transmission and reception component and configured to transmit a signal to and receive a signal from the wireless tag by radio waves radiated in a third range whose height is different from that of the predetermined range of the radio waves radiated by the first transmission and reception component; and a fourth transmission and reception component arranged side by side with the third transmission and reception component, and configured to transmit a signal to and receive a signal from the wireless tag by radio waves radiated in a fourth range that is at least partially deviated from the third range of the radio waves radiated by the third transmission and reception component, wherein the reading component reads signals received by the third transmission and reception component and the fourth transmission and reception component from the wireless tag, and when the wireless tag detected by one of the third transmission and reception component and the fourth transmission and reception component is detected by other of the third transmission and reception component and the fourth transmission and reception component based on a reading result of the reading component, the determination component determines that a movement direction of the wireless tag is a direction from the one of the third transmission and reception component and the fourth transmission and reception component toward the other.

3. The reading device according to claim 2, further comprising:

a first housing configured to accommodate the first transmission and reception component and the second transmission and reception component;

a second housing configured to accommodate the third transmission and reception component and the fourth transmission and reception component; and a stand configured to support the first housing and the second housing at different heights.

4. The reading device according to claim 2, wherein the third transmission and reception component and the fourth transmission and reception component are planar antennas that radiate circularly polarized waves.

5. The reading device according to claim 1, wherein the reading component is further configured to drive the first transmission and reception component and the second transmission and reception component sequentially.

6. The reading device according to claim 2, wherein the reading component is further configured to drive the third transmission and reception component and the fourth transmission and reception component sequentially.

7. A method of reading a moving wireless tag, comprising:

transmitting a signal to and receiving a signal from a wireless tag by radio waves radiated in a predetermined range including a horizontal direction by a first transmission and reception component;

transmitting a signal to and receiving a signal from the wireless tag by radio waves radiated in a second range that is at least partially deviated from the predetermined range of the radio waves radiated by the first transmission and reception component by a second transmission and reception component arranged side by side with the first transmission and reception component;

a reading component configured to reading signals received by the first transmission and reception component and the second transmission and reception component from the wireless tag; and when the wireless tag detected by one of the first transmission and reception component and the second transmission and reception component is detected by other of the first transmission and reception component and the second transmission and reception component based on a reading result, determining that a movement direction of the wireless tag is a direction from the one of the first transmission and reception component and the second transmission and reception component toward the other, wherein the first transmission and reception component and the second transmission and reception component are planar antennas that radiate circularly polarized waves, and an angle formed by back surfaces of the first transmission and reception component and the second transmission and reception component on a side on which the circularly polarized waves are radiated is an obtuse angle.

8. The method according to claim 7, further comprising:

transmitting a signal to and receiving a signal from the wireless tag by radio waves radiated in a third range whose height is different from that of the predetermined range of the radio waves radiated by the first transmission and reception component by a third transmission and reception component located at a position different in height from the first transmission and reception component;
transmitting a signal to and receiving a signal from the wireless tag by radio waves radiated in a fourth range that is at least partially deviated from the third range of the radio waves radiated by the third transmission and reception component by a fourth transmission and reception component arranged side by side with the third transmission and reception component;
reading signals received by the third transmission and reception component and the fourth transmission and reception component from the wireless tag; and
when the wireless tag detected by one of the third transmission and reception component and the fourth transmission and reception component is detected by other of the third transmission and reception component and the fourth transmission and reception component based on a reading result, determining that a movement direction of the wireless tag is a direction from the one of the third transmission and reception component and the fourth transmission and reception component toward the other.

9. The method according to claim 8, further comprising:
accommodating in a first housing the first transmission and reception component and the second transmission and reception component;
accommodating in a second housing the third transmission and reception component and the fourth transmission and reception component; and
supporting the first housing and the second housing at different heights.

10. The method according to claim 8, wherein
the third transmission and reception component and the fourth transmission and reception component are planar antennas that radiate circularly polarized waves.

11. The method according to claim 7, further comprising:
driving the first transmission and reception component and the second transmission and reception component sequentially.

12. The method according to claim 8, further comprising:
driving the third transmission and reception component and the fourth transmission and reception component sequentially.

13. A reading device, comprising:
a first transmission and reception component configured to transmit a signal to and receive a signal from a wireless tag by radio waves radiated in a predetermined range including a horizontal direction;
a second transmission and reception component arranged side by side with the first transmission and reception component and configured to transmit a signal to and receive a signal from the wireless tag by radio waves radiated in a second range that is at least partially deviated from the predetermined range of the radio waves radiated by the first transmission and reception component;
a reading component configured to read signals received by the first transmission and reception component and the second transmission and reception component from the wireless tag;
a determination component configured to, when the wireless tag detected by one of the first transmission and reception component and the second transmission and reception component is detected by other of the first transmission and reception component and the second transmission and reception component based on a reading result of the reading component, determine that a movement direction of the wireless tag is a direction from the one of the first transmission and reception component and the second transmission and reception component toward the other;
a third transmission and reception component located at a position different in height from the first transmission and reception component and configured to transmit a signal to and receive a signal from the wireless tag by radio waves radiated in a third range whose height is different from that of the predetermined range of the radio waves radiated by the first transmission and reception component; and
a fourth transmission and reception component arranged side by side with the third transmission and reception component, and configured to transmit a signal to and receive a signal from the wireless tag by radio waves radiated in a fourth range that is at least partially deviated from the third range of the radio waves radiated by the third transmission and reception component, wherein
the reading component reads signals received by the third transmission and reception component and the fourth transmission and reception component from the wireless tag, and
when the wireless tag detected by one of the third transmission and reception component and the fourth transmission and reception component is detected by other of the third transmission and reception component and the fourth transmission and reception component based on a reading result of the reading component, the determination component determines that a movement direction of the wireless tag is a direction from the one of the third transmission and reception component and the fourth transmission and reception component toward the other.

14. The reading device according to claim 13, wherein
the first transmission and reception component and the second transmission and reception component are planar antennas that radiate circularly polarized waves, and an angle formed by back surfaces of the first transmission and reception component and the second transmission and reception component on a side on which the circularly polarized waves are radiated is an obtuse angle.

15. The reading device according to claim 13, further comprising:
a first housing configured to accommodate the first transmission and reception component and the second transmission and reception component;
a second housing configured to accommodate the third transmission and reception component and the fourth transmission and reception component; and
a stand configured to support the first housing and the second housing at different heights.

16. The reading device according to claim 13, wherein
the third transmission and reception component and the fourth transmission and reception component are planar antennas that radiate circularly polarized waves.

17. The reading device according to claim 13, wherein
the reading component is further configured to drive the first transmission and reception component and the second transmission and reception component sequentially.

18. The reading device according to claim 13, wherein the reading component is further configured to drive the third transmission and reception component and the fourth transmission and reception component sequentially.

* * * * *